United States Patent [19]

Long

[11] Patent Number: 4,796,745
[45] Date of Patent: * Jan. 10, 1989

[54] CONTINUOUS CONVEYING APPARATUS

[76] Inventor: Marshall Long, 11147 Old Harbour Rd., North Palm Beach, Fla. 33408

[*] Notice: The portion of the term of this patent subsequent to Aug. 18, 2004 has been disclaimed.

[21] Appl. No.: 82,835

[22] Filed: Aug. 6, 1987

Related U.S. Application Data

[62] Division of Ser. No. 802,705, Nov. 29, 1985, Pat. No. 4,686,894.

[51] Int. Cl.⁴ .............................................. B65Q 47/24
[52] U.S. Cl. .................................... 198/407; 198/614; 198/774; 198/409
[58] Field of Search ................. 198/778, 774, 406, 614, 198/603, 831, 787, 407, 408, 409

[56] References Cited

U.S. PATENT DOCUMENTS

| | | | |
|---|---|---|---|
| 1,031,481 | 7/1912 | Snyder | 198/406 X |
| 1,737,829 | 12/1929 | Cosgrove | 198/787 X |
| 2,339,832 | 1/1944 | Arnold | 198/774 X |
| 2,479,709 | 8/1949 | Arnold | 198/774 |
| 2,497,768 | 2/1950 | Halcaed | 198/774 |
| 2,622,721 | 12/1952 | Ferguson | 198/787 |
| 2,933,179 | 4/1960 | Hirs | 198/774 |
| 2,990,052 | 6/1961 | Stille et al. | 198/831 X |
| 3,610,404 | 10/1971 | Fleishauer | 198/787 |
| 4,071,137 | 1/1978 | Fink | 198/774 |
| 4,686,894 | 8/1987 | Long | 198/750 X |

Primary Examiner—Robert J. Spar
Assistant Examiner—D. Glenn Dayoan
Attorney, Agent, or Firm—Hovey, Williams, Timmons & Collins

[57] ABSTRACT

A cooker for continuous grilling of hamburger patties and the like uses a shiftable grid which intermittently lifts the patties off a stationary grid and effects advancement after each lift-off until a U-shaped path is traversed extending initially through and terminating beyond one end of the cooker exteriorly thereof. The patties travel upwardly along a straight line with respect to a first pair of legs of the grids and thence upwardly and arcuately with respect to a pair of first grid quadrants, whereupon they invert and drop such as to travel upwardly and arcuately with respect to a pair of second grid quadrants. Finally, the patties travel upwardly along a straight line with respect to a pair of legs of the grids forming the final stretch of the travel.

10 Claims, 4 Drawing Sheets

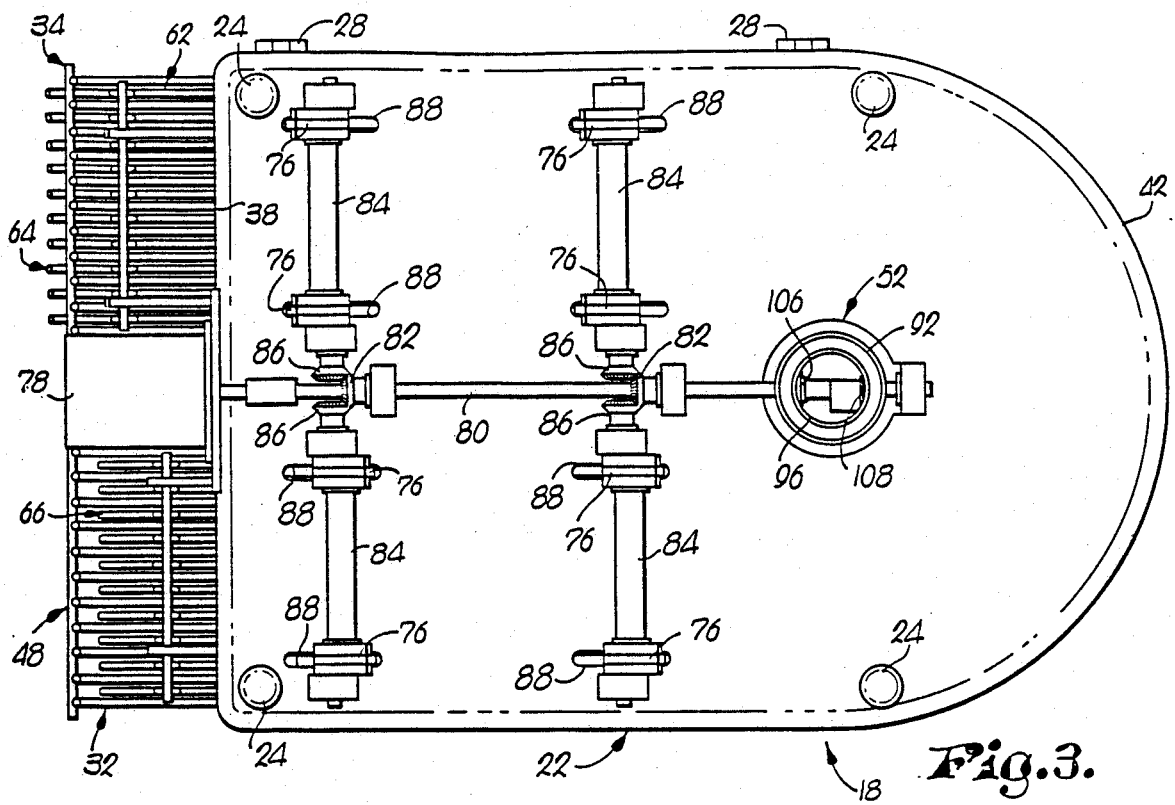
Fig.3.
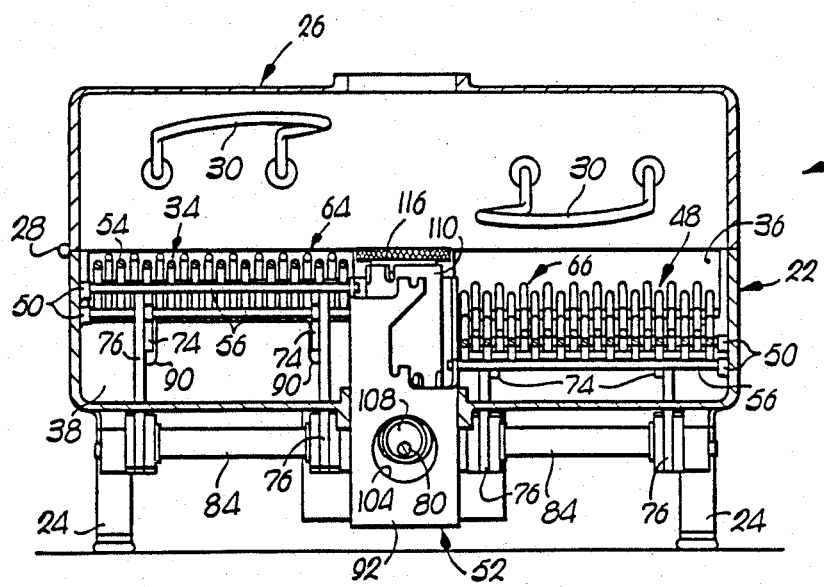
Fig.4.
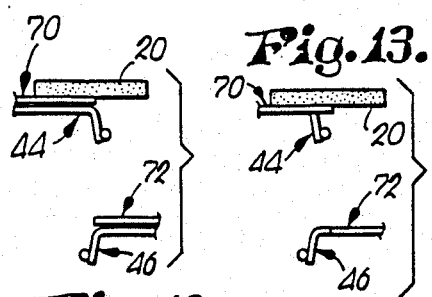
Fig.12.
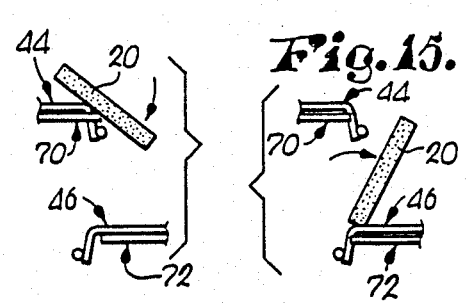
Fig.13. Fig.14.
Fig.15.
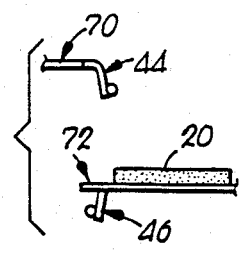
Fig.16.

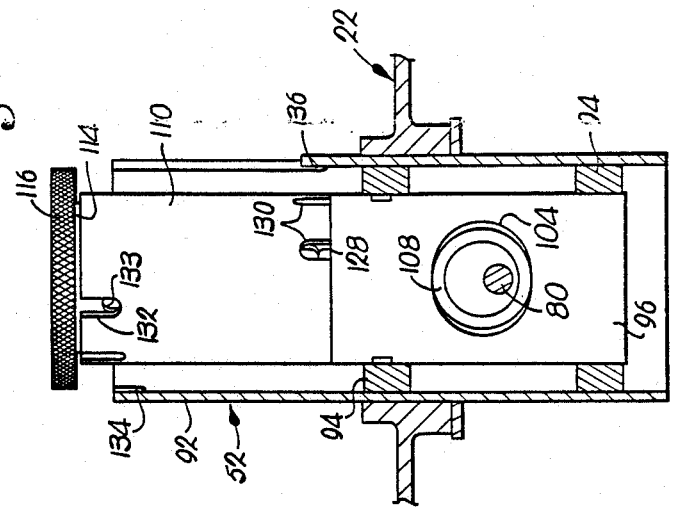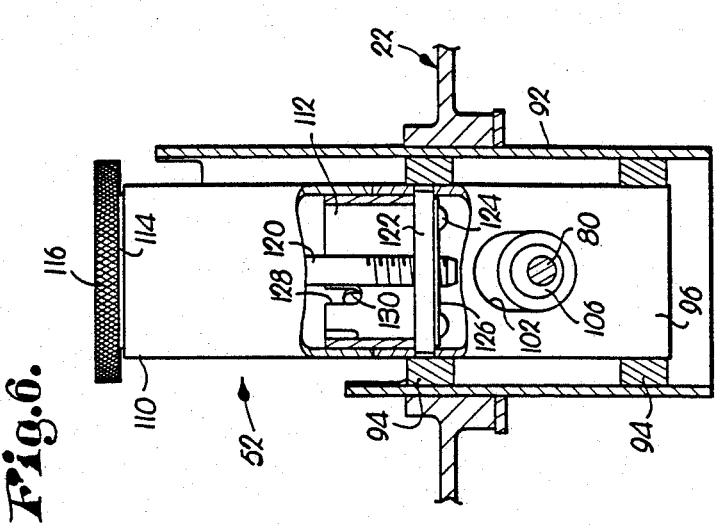

CONTINUOUS CONVEYING APPARATUS

This is a division of application Ser. No. 802,705 filed on Nov. 29, 1985 now U.S. Pat. No. 4,686,894.

BACKGROUND OF THE INVENTION

1. Field of the Invention

The present invention relates to continuous grilling of food items after they enter the cooker, are advanced intermittently along a U-shaped path of travel and are discharged from the cooker, the grilling taking place on both sides by automatic inversion midway their path.

Apparatus has heretofore been suggested for cooking food as it is moved along a circular cooking platform. Known additionally are automatic, oval cooking grills which turn the articles over to cook each side. Moreover, walking beam conveyors are somewhat commonplace.

However, in the field of continuous grilling of food, the improvements of my instant invention are novel from many important standpoints. I use a movable grid having spaced rods which interleave with the spaced rods of a stationary grid during raising of the food products off the latter and advancing the same along a U-shaped path each time the movable grid is actuated. Walking beams raise and shift two legs of the food-advancing grid whereas a tubular assembly controls the arcuate movement to advance the products from one to the other of the straight legs.

2. Summary of the Invention

The entire operation is effected by use of a single motor which not only actuates the walking beams but the tubular assembly at the inside center of the bight of two grids. Each grid at such bight is divided into a pair of quadrants such that the products are delivered from one quadrant to the other. The travel is upwardly and forwardly during the first half of the trip through the cooker and upwardly and rearwardly during the second half of product travel. Hence, the products must drop from the first to the second sections of the grid arrangements before commencing the return journey.

The quadrants are so arranged that during such dropping the products land upside down, thereby grilling both sides of the products before they emerge from the cooker. Electric cooking elements inside the cooker are spaced above the traveling products. For cleaning purposes the stationary grid is removably carried by the kettle, and the shiftable grid is removably carried by the walking beams and the tube assembly.

IN THE DRAWINGS

FIG. 3 is a view looking upwardly toward the bottom of the kettle;

FIG. 4 is a cross sectional view taken on line 4—4 of FIG. 1;

FIG. 5 is an enlarged, fragmentary, vertical cross sectional view through the tubular assembly at the axis of the quadrants of the grids;

FIG. 6 is a fragmentary, elevational view of the tubular assembly, partially in section, taken at right angles to FIG. 5 looking toward the quadrants;

FIG. 7 is a view similar to FIG. 6 looking away from the quadrants;

FIG. 8 is a fragmentary top plan view of the tubular assembly and certain grid work with the lid removed;

FIGS. 12–16 inclusive are diagrammatical views showing the inversion of a food item broiled by the cookers.

DESCRIPTION OF THE PREFERRED EMBODIMENT

Figure 2:
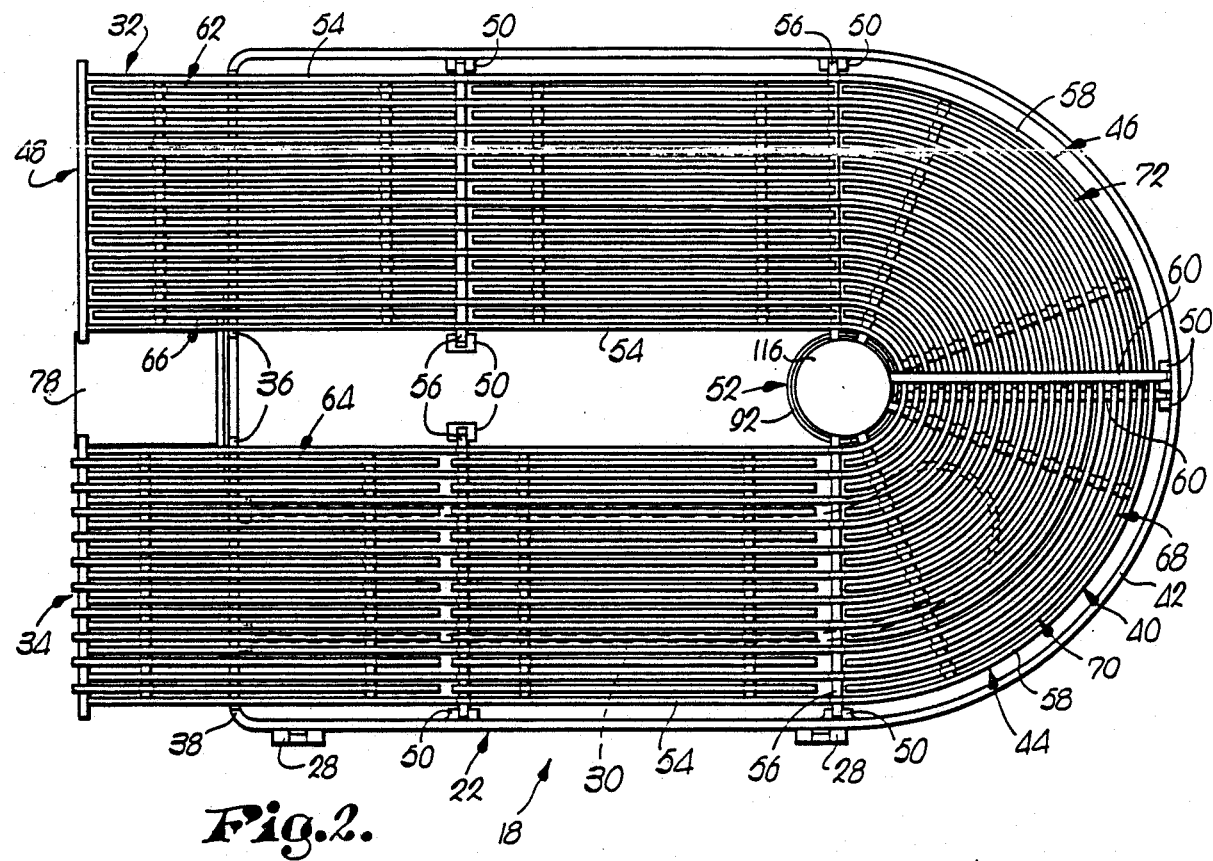
FIG. 2 is a top plan view thereof with the cover removed.

In the embodiment of FIGS. 1–8, a cooker 18 for broiling food items 20, such as hamburger patties (FIGS. 12–16), has a kettle 22 supported by legs 24 and carrying a cover 26 through use of hinges 28. After the items 20 enter one end of the kettle 22, they are advanced continuously by intermittent pulses along a U-shaped path and before emerging from the same end of the kettle 22, they are broiled on both sides as the result of being continuously subjected to heat thereabove emanating from electric heaters 30 carried by the cover 26 therewithin. Flipover of the items 20 midway their travel (FIGS. 12–16) occurs automatically as hereinafter explained.

A primary, stationary grid 32 has a U-shaped configuration to present a first elongated leg 34 which receives the items 20 exteriorly of the kettle 22 for advancement through an opening 36 in one end 38 of the kettle 22. The grid 32 has a semi-circular bight 40 at the opposite end 42 of the kettle 22, made up of a first quadrant 44, as a continuation of the leg 34, and a second quadrant 46 from which a second leg 48 extends, terminating outside the kettle 22 after passing through the opening 36, rendering the cooked items 20 accessible. The leg 48 is a continuation of the quadrant 46 and is disposed in spaced parallelism to the leg 34.

Figure 1:
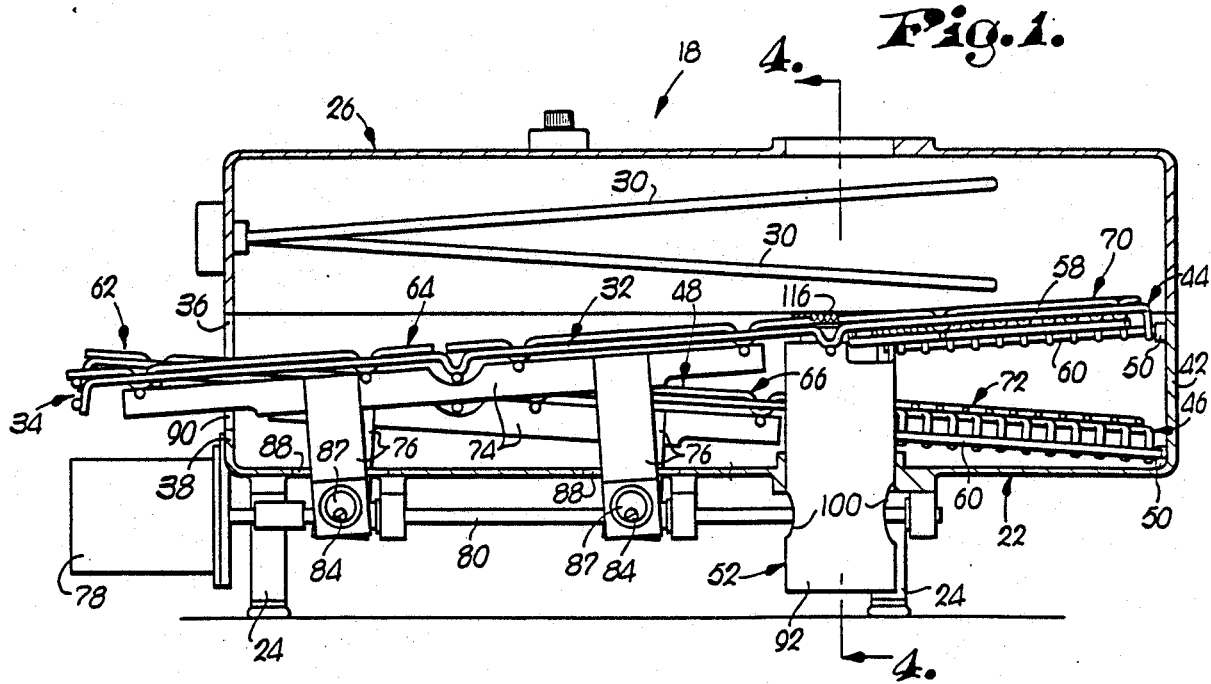
FIG. 1 is a side elevational view of a continuous cooking grill made according to one form of my present invention, the kettle and its cover being in section.

The leg 34 and its quadrant 44 slope upwardly as the end 38 of the kettle 22 is approached whereas the leg 48 and its quadrant 46 slope upwardly as the end 38 of the kettle 22 is approached, with the two U-shaped heaters 30 sloping accordingly (FIG. 1). The straight terminal ends of the quadrants 44 and 46 extend radially inwardly of the U-shaped end 42 with such end of the quadrant 44 spaced above the end of the quadrant 46 (FIGS. 12–16).

The grid 32 is removably supported by the kettle 22 through use of open top, notched lugs 50 rigid to the kettle 22 and by an upstanding tubular assembly 52 extending through the bottom of the kettle 22 at the axis of the bight 40. Each leg 34, 48 has a plurality of spaced, longitudinal rod elements 54 rigidly interconnected by cross bars 56, the latter of which rest in the lugs 50. The quadrant sections 44 and 46 have arcuate rod elements 58 joined by cross bars 60 at the terminal ends thereof, the bars 60 being supported by lugs 50 at the center of the wall 42 and by the assembly 52.

A U-shaped secondary grid 62, shiftable up and down intermittently relative to the grid 32 is provided with sloping legs 64 and 66 corresponding to the legs 34 and 48 respectively and a bight 68 corresponding to the bight 40. And, as in the case of the grid 32, the bight 40 has a pair of sloping sections 70, 72 in the form of quadrants corresponding to the quadrants 44 and 46 respectively. Once again, as shown, the removable legs 64, 66 have straight, spaced, parallel rod elements secured to cross bars, and the removable quadrants have arcuate rod elements secured to cross bars. However, each leg 64, 66 has a pair of separate, end-to-end parts, and the quadrants 70, 72 are separate from each other and from the legs 64, 66.

Each leg 64, 66 is supported by a pair of elongated, inclined, spaced, walking beams 74 extending from the exterior of the kettle 22 and through the opening 36, terminating adjacent the assembly 52. The upper edges of the beams 74 are notched to receive the cross bars of the legs 64, 66 and each beam 74 has a pair of spaced supporting members 76 depending therefrom.

A motor 78 has a driveshaft 80 rotatably suspended from the bottom of the kettle 22 and provided with a pair of bevel gears 82. Each of the four driven eccentric shafts 84, rotatably suspended from the bottom of the kettle 22 and corresponding with the members 76, is provided with a bevel gear 86. Two of the eccentric shafts 84 radiate from the shaft 80 in one direction and have their gears 86 in mesh with corresponding gears 82, whereas another pair of the eccentric shafts 84 radiate in the opposite direction from the shaft 80 and also have their gears 86 in mesh with corresponding gears 82. Thus, the eccentric shafts 84 on one side of the shaft 80 are rotated in one direction and the opposite pair of eccentric shafts 84 are driven in the opposite direction by the shaft 80 during operation of the motor 78. Each member 76 has a circular hole rotatably receiving eccentric portion 87 of the shaft 84 (FIG. 1).

Accordingly, the beams 74 and their legs 64, 66 travel through essentially circular paths. The leg 64 rises, progresses toward the quadrant 44, descends and regresses toward the end 38 during each cycle. Simultaneously, the leg 66 rises, progresses toward the end 38, descends and regresses toward the quadrant 46. The rods of the legs of the grid 62 interleave with the rods 54 of the legs 34, 48 such that, during each cycle, the legs of the grid 62 rise above the legs 34, 48 to raise the items 20 off the legs 34, 48. After the items 20 on the leg 34 are raised they are advanced toward the quadrant 44 and then set back onto the leg 34. Conversely, after the items 20 on the leg 48 are raised they are advanced toward the end 38 and then set back onto the leg 48. Manifestly, such intermittent movement of the items 20 toward and away from the bight 40 takes place during each cycle of the beams 74. Incidentally, slots 88 in the bottom of the kettle 22 for clearing the members 76 are best shown in FIGS. 1 and 3, and slots 90 (FIG. 4) in the end 38 clear the beams 74. Not shown are two brackets which extend upwardly from the bottom of the kettle 22 for supporting the two lugs 50 shown in FIG. 2 between the legs 34 and 48.

Referring now in more detail to the assembly 52, especially FIGS. 5-8, there is provided an outer, upright tube 92, open at both ends and extending through the bottom of the kettle 22, to which the tube 92 is firmly attached. Bearings 94 in the tube 92 surround a vertically reciprocable, inner tube 96 which is oscillatory about its upright axis of reciprocation.

The tube 96 is so moved by the continuation of shaft 80 passing through diametrically opposed clearance openings 100 in the tube 92. The tube 96 has an oblong hole 102 with its major axis disposed vertically and an opposed, oblong hole 104 having it major axis disposed horizontally. A rotor 106 engaging the tube 96 in the hole 102 is eccentric to and rigid to the shaft 80, and a rotor 108 engaging the tube 96 in the hole 104 is eccentric to and also rigid to the shaft 80. A third tube 110 is an upper contination of the tube 96, although separate therefrom, and a fourth tube 112 is surrounded by the tubes 96 and 110. A fifth tube 114 is disposed in the tube 110 at the upper end of the latter.

A knurled cap 116 has an inner flange 118 loosely fitted into the tube 114 and a bolt 120 rigid thereto and threaded into a bar 122 extending across the tube 112 and notched at its ends into the tubes 96 and 112. Fasteners 124 attach a closure plate 126 for the bottom of the tube 112 to the bar 122.

Notches are illustrated in FIGS. 5-7 for releasably receiving certain components of the grid assemblies 32 and 62. The tube 112 has a number of such notches 128 at its upper edge for receiving the cross bars of the quadrant 72 which are, in turn, cleared by notches 130 in the tube 110. The tube 110 is also provided with notches 132 in its upper edge which correspond to notches 133 in tube 114 for receiving the cross bar at the terminal end of the quadrant 70. The outer tube 92 has notches 134 and 135 at its upper end which receive the proximal bars 56 and 60 respectively of the leg 34 whereas the cross bar 56 of the leg 48 is received in a long notch 136 in the tube 92.

Therefore, the grids 32 and 62 may be removed from the kettle 22 by first turning the cap 116 to release the bolt 120 from the bar 122. Then, by slipping the tube 114 from within the tube 110, the quadrant 70 is released from the notches 132 and 133. Next, the tube 110 may be slipped off the tube 112 to clear the notches 128 and 130 such as to release the quadrant 72, and the leg 34 as well as the quadrant 48 can be readily removed from the notches 134 and 136. The legs 34 and 48 are simply lifted out of the lugs 50 and the legs 64 and 66 are lifted off the beams 74.

OPERATION

A predetermined, elevated temperature is produced in the cooker 18 by use of a suitable control for the heaters 30, and a desired speed of rotation of the shaft 80 is selected by a suitable control for the motor 78. The food items 20 placed on the leg 34 of the grid 32 exteriorly of the cooker 18, are advanced through the opening 36 of the kettle 22, and cooking continues until they exit through the opening 36 on the leg 48 outside the wall 38.

Rotation of the shaft 80 causes the shafts 84 to rotate through the gears 82 and 86 causing rotation of all four eccentric shafts 84 in their corresponding members 76. Each time the leg 64 rises and progresses toward the quadrant 70, the items 20 are raised off the leg 34 and advanced toward the end 42 of the kettle 22. Simultaneously, each time the leg 66 rises and progresses away from the quadrant 72 the items 20 are raised off the leg 48 and advanced toward the end 38 of the kettle 42.

All the while, the shaft 80 rotates the rotors 106 and 108 continuously to oscillate and raise and lower the tube 96 as well as all parts carried thereby. This causes the quadrant 70 to raise the items 20 (received from the leg 64) and carry the items 20 along an arcuate path toward the quadrant 72.

As demonstrated by FIGS. 12-16, when the items 20 arrive at the discharge end of the quadrant 70 (such end extending radially inwardly from the end 42 of the kettle 22 toward the assembly 52), they tilt downwardly and then fall upside down onto the lower quadrant 72 as shown by the arrows. Immediately, the inverse side of the items 20 begin to cook, such cooking continuing throughout the arcuate movement along the quadrant 72 and the leg 66. Manifestly, the movement of the inverted items 20 along the quadrant 72 until delivered to the leg 66 also results from the rise and fall of the tube 96 by action of the rotor 108 and oscillation of the tube 96 during rotation of the rotor 106.

The up and down and arcuate movement is imparted from the assembly 52 to the quadrants 70 and 72 simultaneously with the quadrant 70 moving arcuately away from the leg 64 and the quadrant 72 moving arcuately toward the leg 66 during travel of the items along the bight 68. As in the case of the action imparted to the legs 64 and 66 by the beams 74, the assembly 52 causes the quadrants 70 and 72 to descend below the quadrants 44 and 46 and regress toward the leg 64 and away from the leg 66 during each cycle, depositing the items 20 back onto the quadrants 44 and 46 each time the quadrants 70 and 72 pass beneath the upper surfaces of the quadrants 44 and 46.

During the successive, intermittent advancements of the items 20 along the leg 34, thence along the bight 40 and finally along the leg 48, they are continuously cooked on both sides to the extent desired by adjustment of the heaters 30 and/or the speed of the motor 78 prior to successive emergence of the items 20 from the end 38 of the kettle 22. While conveyance of the items 20 is not continual, there is no pause except somewhat momentarily each time the items come to rest on the grid 32.

Figure 9:
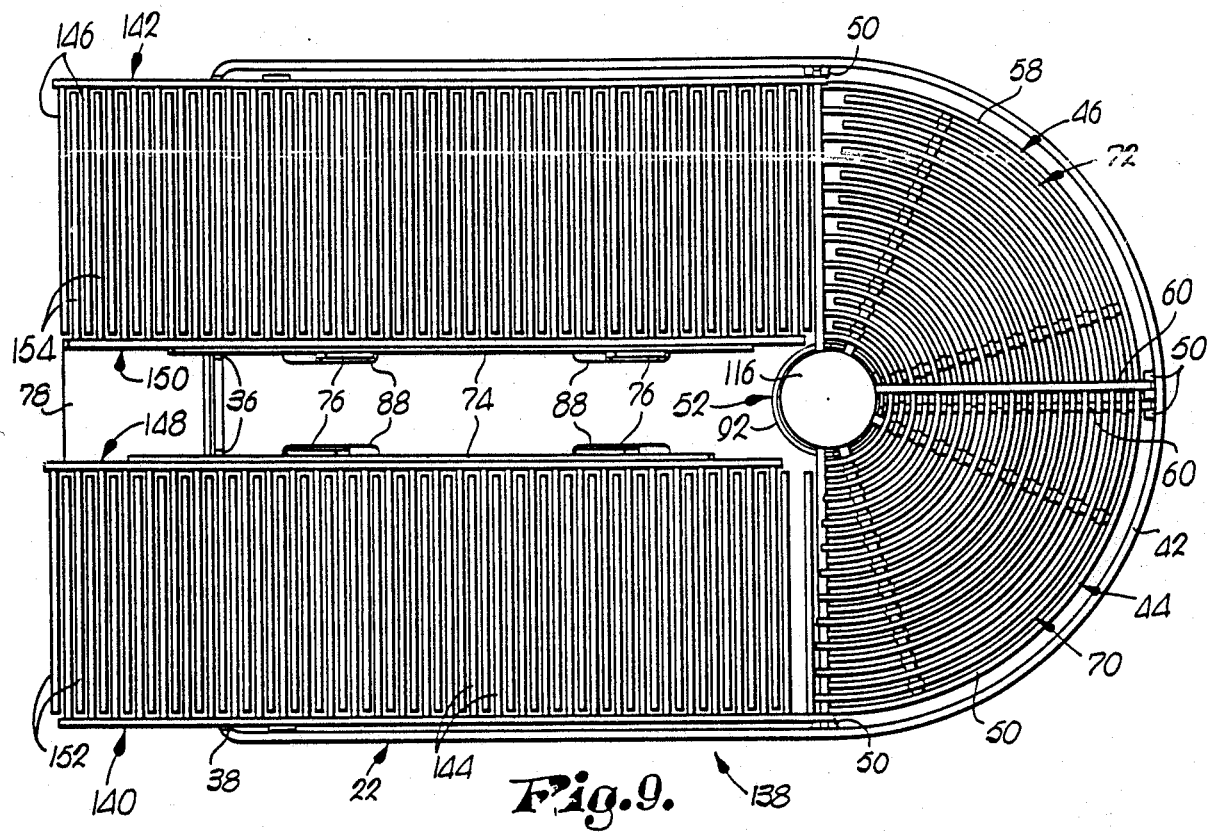
FIG. 9 is a view similar to FIG. 2 showing a modified form of the grill.
Figure 10:
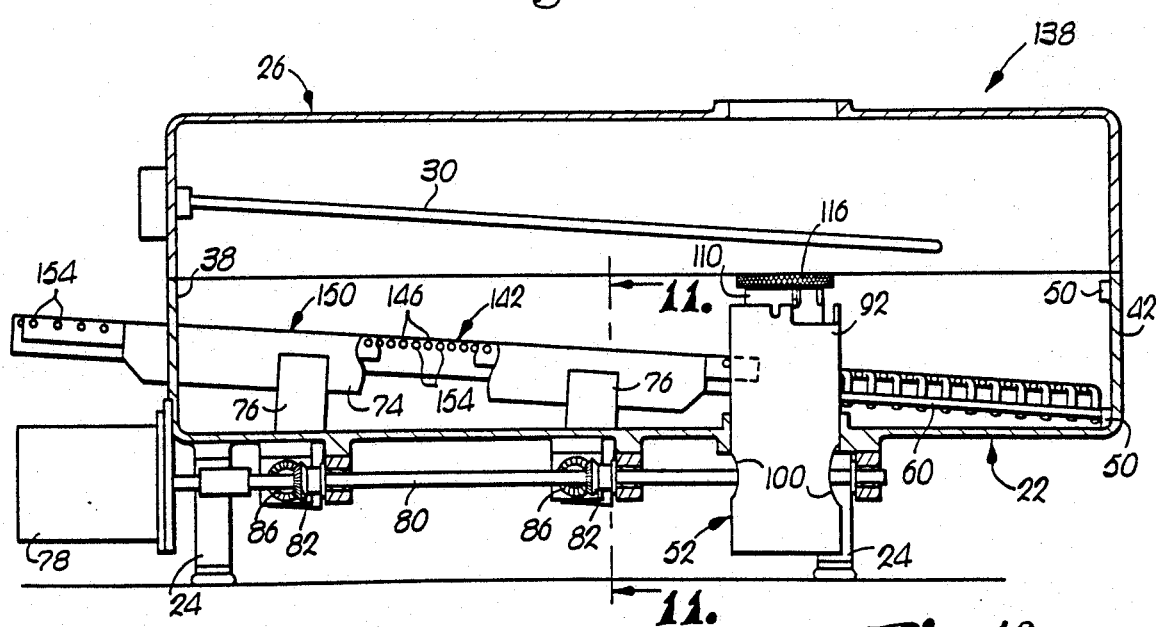
FIG. 10 is a view similar to FIG. 1 of the grill shown in FIG. 9.
Figure 11:
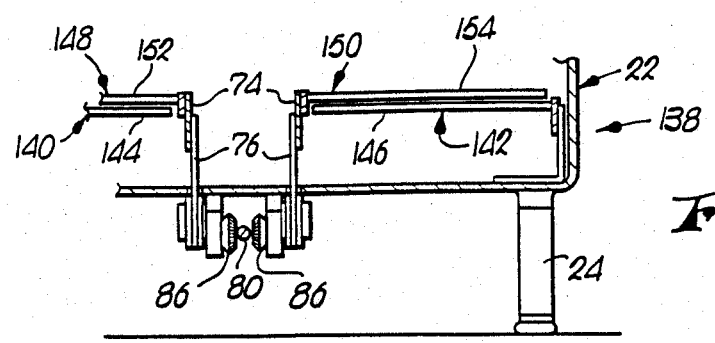
FIG. 11 is a fragmentary cross sectional view taken on line 11—11 of FIG. 10.

A cooker 138 as shown in FIGS. 9–11, differs from the cooker 18 of FIGS. 1–8 only with respect to the nature of the two legs of the stationary grid and of the movable grid. Therefore, the same numerals are used with respect to components which are the same in both cookers 18 and 138. Legs 140 and 142 of the stationary grid have rods 144 and 146 rigidly secured to the kettle 22 and extending inwardly from corresponding sides of the kettle 22. The spaced rods 144 continue from the exterior of the end wall 38 to the quadrant 44 and the spaced rods 146 continue from the quadrant 46 to and through the opening 36.

On the other hand, legs 148 and 150 of the movable grid each have a series of rods 152 and 154 extending toward the sides of the kettle 22. Once again the rods 152 continue through the opening 36 to the quadrant 70 and the rods 154 extend from the quadrant 72, terminating beyond the end wall 38. The inner ends of the rods 152 and 154 are secured to corresponding beams 74 carried by members 76 actuated by the motor 78 as above explained.

While the cookers 18 and 138 as described above contemplate a stationary grid, e.g. the primary grid 32 and a movable grid, e.g. the secondary grid 62, it is contemplated that both grids be movable if such is to be desired. It has been fully illustrated and carefully explained above how the grid 62 is caused to be moved in relation to the grid 32. As an additional embodiment, I contemplate that the grid 32 be moved in the same manner and through use of the same structural components as employed in connection with the grid 62, and duplication of such components for the grid 32 has not, therefore, been included in the drawings.

It is but necessary to further explain that the two movable grids would move alternately such that one would arrive at its greatest height as the other grid arrives at its lowermost position. Each grid would advance the product the same distance during each cycle of movement. Hence, the speed of advancement of each product would be doubled and, if as such result, the products are not sufficiently cooked by the time they emerge from the cookers 18 or 138, one need merely reduce the speed of the motor 98.

I claim:

1. Conveying apparatus comprising:
   a U-shaped, primary grid, presenting a pair of elongated, spaced legs and a bight having a pair of separate, arcuate sections;
   conveyors for advancing items successively along one of said pair of legs, one of said arcuate sections, the other of said accurate sections and the other of said pair of legs,
   said one of said accurate sections being higher than said other of said arcuate sections whereby the items invert as they fall from the one of said arcuate sections to the other of said arcuate sections at a zone of inversion and thereafter travel upside down,
   said conveyors including a U-shaped secondary grid shiftable intermittently up and down relative to the primary grid for raising the items off the primary grid, said secondary grid having a pair of elongated, spaced legs corresponding to the legs of the primary grid and a pair of separate, arcuate, bight sections corresponding to said bight sections of the primary grid.

2. The invention of claim 1, said one of said pair of legs and said one of said arcuate sections of said primary grid progressively increasing in height as the zone of inversion is approached, said other of said pair of legs and said other of said arcuate sections of said primary grid progressively decreasing in height as said zone of inversion is approached.

3. The invention of claim 1, each grid having a plurality of spaced elements, said elements of the secondary grid being disposed to interleave with, rise above and drop below the elements of the primary grid during each cycle of up and down movement of the secondary grid.

4. The invention of claim 3, said conveyors having means for shifting the elements of the secondary grid and said items each time the elements of the secondary grid are raised above the elements of the primary grid.

5. The invention of claim 3 wherein the secondary grid rises and progresses during a first half of each cycle and descends and regresses during a second half of each cycle.

6. The invention of claim 5, the conveyors for the pair at legs of the secondary grid including an elongated walking beam supporting each leg respectively of the secondary grid, and power means coupled with and common to said walking beams for actuating the same.

7. The invention of claim 6, and a driven shaft for each walking beam respectively, each provided with an eccentric, beam-supporting shaft, said power means including a drive shaft common to the driven shafts and coupled therewith for rotating the same.

8. The invention of claim 5, the conveyor for the bight sections of the secondary grid including an upright, vertically reciprocable member mounted for oscillation about its axis of reciprocation, said member supporting the bight sections of the secondary grid, and power means coupled with said member for reciprocating and simultaneously oscillating the same.

9. The invention of claim 7, the conveyor for the bight sections of the secondary grid including an upright, vertically reciprocable member mounted for oscillation about its axis of reciprocation, said member supporting the bight sections of the secondary grid, and means coupling the drive shaft with said member for simultaneous reciprocation and oscillation thereof in unison with the actuation of said pair of legs of the secondary grid.

10. The invention of claim 9, said member having a pair of spaced, elliptical openings through which the drive shaft extends, said drive shaft having a first eccentric rotor, engaging the member in one of said openings for reciprocating the member and a second eccentric rotor engaging the member in the other of said openings for oscillating the member.

* * * * *